United States Patent [19]
Harbison

[11] 3,802,822
[45] Apr. 9, 1974

[54] PELLETIZER

[75] Inventor: Charles R. Harbison, Valencia, Pa.

[73] Assignee: Mars Mineral Corporation, Mars, Pa.

[22] Filed: Mar. 1, 1972

[21] Appl. No.: 230,740

[52] U.S. Cl.............. 425/222, 23/313, 264/117, 259/14, 259/176
[51] Int. Cl............................................. B22f 3/00
[58] Field of Search ............. 23/313, 314; 264/117; 18/1; 259/3, 15, 16, 176, 177 R, 14; 425/222

[56] References Cited
UNITED STATES PATENTS

| | | | |
|---|---|---|---|
| 2,892,689 | 6/1959 | Rushford | 23/314 |
| 2,888,334 | 5/1959 | Schonbeck | 23/314 |
| 2,710,423 | 6/1955 | Douglas | 23/313 |
| 3,321,186 | 5/1967 | Lodige | 259/3 |
| 3,446,218 | 5/1969 | Stirling | 23/313 |
| 2,436,766 | 2/1948 | David | 23/313 |
| 2,561,055 | 7/1951 | Hood | 23/313 |
| 2,947,026 | 8/1960 | Vaney | 23/313 |
| 2,185,158 | 12/1939 | Price | 259/3 |
| 2,674,522 | 4/1954 | Takewell | 23/314 |
| 3,169,269 | 2/1965 | McDowell | 23/313 |
| 3,210,772 | 10/1965 | Stirling | 425/222 |
| 3,335,456 | 8/1967 | Oya | 425/222 |
| 3,345,683 | 10/1967 | Eirich | 425/222 |

FOREIGN PATENTS OR APPLICATIONS 741,431   12/1955   Great Britain........................ 259/3

Primary Examiner—Norman Yudkoff
Assistant Examiner—S. J. Emery
Attorney, Agent, or Firm—Webb, Burden, Robinson & Webb

[57] ABSTRACT

An apparatus for pelletizing particulate materials comprising a rotating drum journaled on a screw feeder such that the screw feeder feeds into the bottom of the drum below the surface of the pelletizing bed.

2 Claims, 3 Drawing Figures

PATENTED APR 9 1974

3,802,822

PELLETIZER

This invention relates to an apparatus for pelletizing particulate materials. There are several types of pelletizers for creating a churning bed of moist particles which grow as the moist surfaces of the particles pick up dry materials continuously added to the bed. One type of pelletizer is known as the fluidized bed pelletizer and it is exemplified by the device shown in U.S. Pat. No. 2,864,674, issued to W. R. King. Another type of pelletizer is known as the flying disc and is shown, for example, in U.S. Pat. No. 2,860,598, issued to E. G. Loesche. Yet another type of pelletizer is a drum bed pelletizer of the type shown in U.S. Pat. No. 2,436,771, issued to R. S. Hood. These pelletizers are suitable for various purposes and materials. However, with the ever increasing interest in preservation of our enviornment, it has become necessary to find ways to pelletize flue dust, for example, fly ash. Flue dust is very fine particles precipitated from furnace exhaust gases and the like. These materials have such a fine particle size that in some ways they behave much like fluids. This invention is directed to an apparatus which is especially suitable for pelletizing very fine fluid-like particulate materials.

It is an object according to this invention to provide an extremely versatile pelletizing apparatus which can be easily and automatically adjusted to provide the optimum pelletizing conditions for the particular particulate material which is being agglomerated. It is yet another advantage of this invention to provide a pelletizing apparatus which requires less overhead space than prior devices. It is yet another advantage of this invention to provide a pelletizing apparatus in which the flow within the bed is not disturbed at or near the surface of the bed by devices penetrating the surface of the bed. It is also an advantage that because it is not necessary to have devices penetrating the surface of the bed, the build-up and caking problems well known in the art are avoided. It is yet another advantage of the apparatus according to this invention that it can be emptied easily should the agglomerating process be shut down without a laborious disassembly of devices that might be extending into the drum.

Briefly, according to this invention, there is provided an apparatus for pelletizing particulate materials in a pelletizing bed made in a pelletizing drum having an open and closed end. The closed end of the pelletizing drum is journaled about a screw feeder to rotate about an axis substantially parallel to the axis of the screw feeder. Preferably, the axis of rotation of the drum is substantially the same axis as the axis of the screw feeder. Hence, the screw feeder enters the closed end of the drum and, therefore, may feed into the lower end of the drum below the surface of the pelletizing bed in the drum. It is preferable that a substantially air-tight seal be provided between the closed end of the drum and the outer surface of the screw feeder.

Further features and other objects and advantages of this invention will become clear to those skilled in the art from a study of the following detailed description made with reference to the drawings in which.

Figure 1:
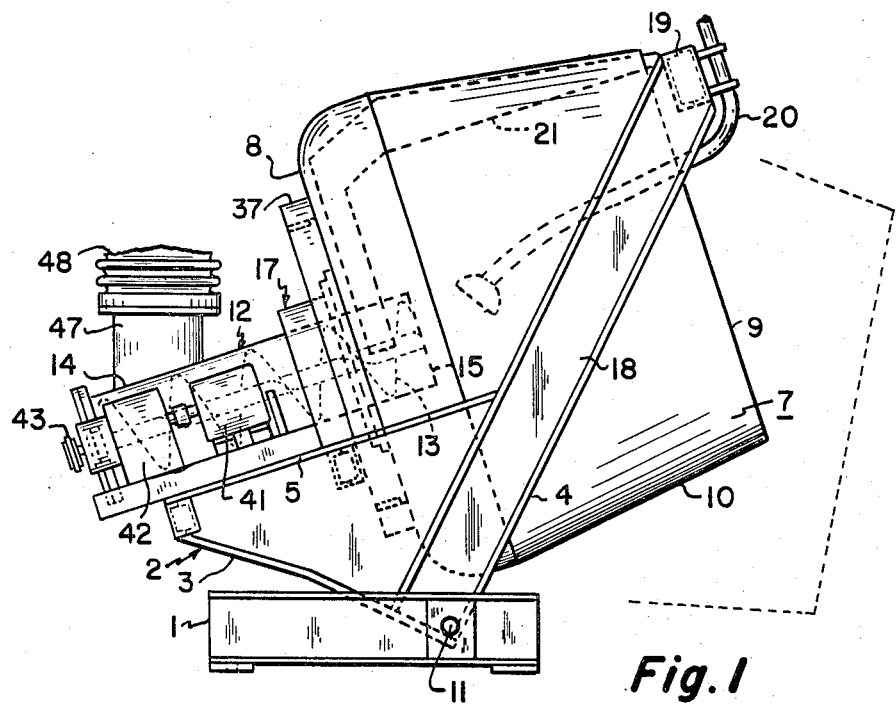
FIG. 1 is an elevation of a pelletizer according to this invention.
Figure 2:
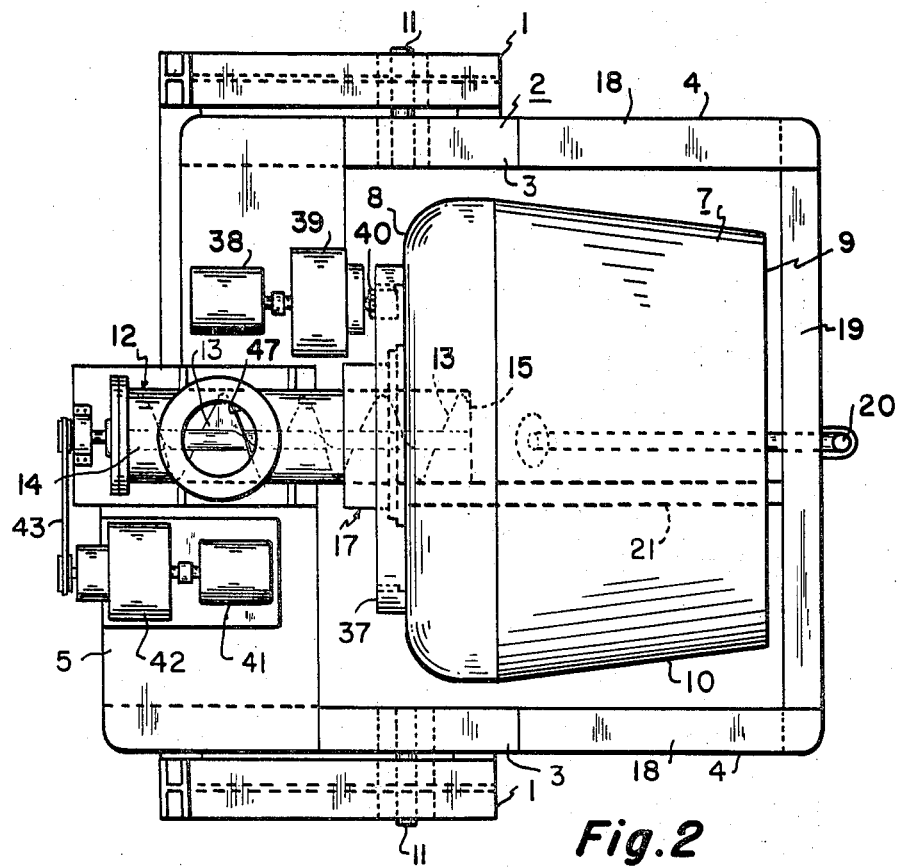
FIG. 2 is a plan view of a pelletizer according to this invention.

Referring now to FIGS. 1 and 2, a pelletizer apparatus according to this invention is mounted upon a base 1. An A-frame shown generally as 2, is comprised of rocker arms 3 and side beams 4 and a motor platform 5. The A-frame is pivotally mounted to the base and provided for rotation about the pivot 11. Stops (not shown) may be provided to fix the frame in various angular positions relative to the base.

A pelletizing drum 7 has a closed end 8 and an open end 9 and a generally cylindrical or conical sidewall 10. Any number of surfaces of rotation can generate a drum of suitable configuration for the purposes of this invention. It is preferable according to this invention that the length of the sidewall 10 is larger than the radius of the widest portion of the drum.

A screw feeder 12 is mounted to the motor platform 5. The screw feeder 12 has a generally cylindrical outer surface and a helical auger 13 journaled therein. The screw feeder has a feed end 14 and a delivery end 15. The delivery end of the screw feeder extends away from the motor platform so that the closed end of the drum may be journaled by a bearing 17 to the outer surface of the screw feeder. Other suitable feeders might have a ram or a pump in place of the screw.

The A-frame 2 preferably has extensions 18 which may be a portion of the legs 4 extending along the side of the drum providing support for a cross member 19 positioned adjacent the opening 9 of the drum.

According to a preferred embodiment of this invention, a scraper 21 is secured at one end to the cross member 19. The scraper generally conforms to the inner surface of the drum and also is secured to that portion of the screw feeder extending into the drum.

Figure 3:
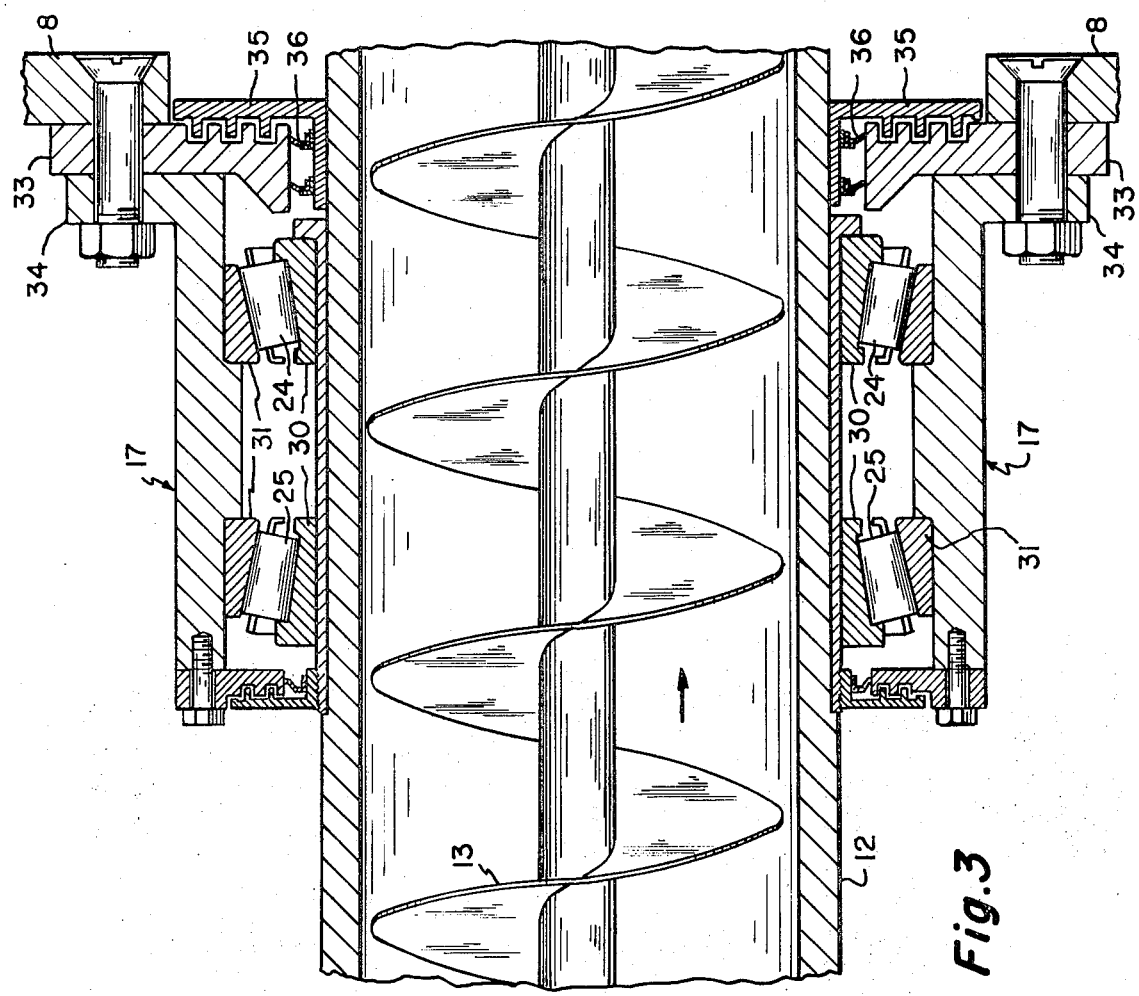
FIG. 3 is a detail of the bearing and means for sealing the closed end of the pelletizing drum and the outer surface of the screw feeder.

The bearings for journaling the drum about the screw feeder may be any suitable bearings as, for example, shown in FIG. 3. The conical bearings 24 and 25 between the inner and outer races 30 and 31 should be protected from the particulate matter being agglomerated. The inner race 30 is secured to the outer surface of the screw feeder 12 and the outer race is secured to the closed end of the drum 8. The bearing is protected from the fine particulate batch by two mating plates 33 and 35 having concentric intermeshing grooves. One plate 33 is secured between the housing 34 supporting the outer race 30 and the back of the drum 8. Another plate 35 is fastened to the outer surface of the screw feeder 12. Additional pliable bushings 36 serve as a final seal to protect the bearing. Preferably, according to this invention the cylindrical delivery end of the screw feeder 12 extends slightly into the pelletizing drum. In this way, the material being pelletized is by and large partially wetted and agglomerated before reaching the seals, making penetration of the seals less likely.

According to a preferred embodiment of this invention a large ring gear 37 is mounted on the closed end 8 of the drum. A motor 38 and a transmission 39 drive a pinion 40 which is drivingly connected with the ring gear 37 thereby providing rotation to the drum. The motor and transmission may be conveniently mounted to the motor platform 5. A motor 41 and a transmission 42 are drivingly connected, for example, by a belt or chain 43 to the auger 13 of the feeder 12. While transmissions are not essential, they provide greater flexibility. Each material being agglomerated has an optimum feed rate and drum rotation speed to promote agglomerating or pelletizing.

The screw feeder is itself fed preferably from a weight belt conveyor through opening 47. According to a preferred embodiment, the screw is joined with the conveyor belt which must, of course, be enclosed by a flexible conduit 48 which enables the drum to be rotated to alternate positions without making any disconnections whatsoever.

A hose and nozzle 20 for spraying a fluid, such as water, over the surface of the bed is preferably fastened to the cross bar 19. In this way it can be easily adjusted to the optimum agglomerating position for the particular material being agglomerated or pelletized.

The operation of applicant's pelletizing bed is according to the techniques generally known in the art. To a certain extent the feed rate, amount of spray, location of spray, rate of drum rotation and the angle of the drum axis which provide the best pelletizing or agglomerating is empirically determined for any given material. Hence, applicant's drum, having easy adjustment of all of these elements, has great flexibility. Start-up may provide a major problem in prior art devices because of the fluid like nature of certain flue dusts. With an apparatus according to this invention the nozzle 20 is directed at the delivery end of the screw feeder thereby at least partially wetting out the dust just before it emerges from the screw feeder. Also, the spray might be introduced directly into the screw feeder during start-up. When the bed has been built by filling the lower portion of the rotating drum, the water is sprayed over the surface where the larger agglomerates rolling along near the surface pick up smaller particles and dry materials working their way up through the bed. Eventually, the large agglomerates fall over the edge of the drum where they may be gathered or carried away. At the end of a run the entire drum may be emptied by rotating the drum opening down about the pivot 11.

Having thus described the invention with the detail and particularity as required by the Patent Laws, what is desired protected by Letters Patent is set forth in the following claims:

1. An apparatus for pelletizing particulate materials in a pelletizing bed comprising in combination:
   a base;
   a screw feeder comprising a generally cylindrical shell having a helical screw journaled therein, said feeder having a delivery end and a feed end;
   a pelletizing drum having an open and closed end and a sidewall, said closed end of said drum journaled about the outer cylindrical surface of the screw feeder enabling it to rotate about an axis substantially common to the axis of the screw feeder, said screw feeder extending somewhat into the drum, such that the screw feeder feeds through the closed end of the drum said drum having a toothed wheel mounted to the backside of the closed end concentric with the screw feeder the length of said sidewall being larger then the radius of the drum at the widest portion of the drum;
   a frame means secured to the screw feeder and pivotally secured to the base for positioning the feeder and drum at a selected angle to the horizon such that when the drum is filled with sufficient particulate material the feeder feeds the drum below the surface of the pelletizing bed in said drum, said frame comprising rocker arms pivotally mounted to said base and a motor platform, said screw feeder mounted to said platform, such that its delivery end projects therefrom;
   means secured to said motor platform for driving the screw feeder;
   means drivingly connected to said toothed wheel to rotate the drum; and,
   a scraper frame secured to said frame and being an extension thereof for supporting a cross member adjacent the open end of said drum suitable for supporting scrapers and wetting devices.

2. An apparatus according to claim 1 wherein there is a substantially air-tight seal between the base of the drum and the screw feeder.

* * * * *